US008626542B1

(12) United States Patent
Kapoor et al.

(10) Patent No.: US 8,626,542 B1
(45) Date of Patent: Jan. 7, 2014

(54) FULL-KIT MANAGEMENT IN PROJECTS: COMPUTING THE FULL-KIT DELAY

(75) Inventors: Ajai Kapoor, San Jose, CA (US); Pankaj P. Painuly, San Jose, CA (US); Travis F. Higgins, San Francisco, CA (US); Puneet Murgai, Sunnyvale, CA (US); Corvin Bazgan, San Carlos, CA (US); Subramanian Muthu, San Jose, CA (US)

(73) Assignee: Realization Technologies, Inc., San Jose, CA (US)

( * ) Notice: Subject to any disclaimer, the term of this patent is extended or adjusted under 35 U.S.C. 154(b) by 5 days.

(21) Appl. No.: 13/186,336

(22) Filed: Jul. 19, 2011

(51) Int. Cl.
*G06Q 40/00* (2012.01)

(52) U.S. Cl.
USPC ........................................ 705/7.11; 705/7.42

(58) Field of Classification Search
USPC ................................ 705/7.11, 7.42
See application file for complete search history.

(56) References Cited

U.S. PATENT DOCUMENTS

| 2002/0128890 A1* | 9/2002 | Dick et al. | 705/8 |
| 2002/0188597 A1* | 12/2002 | Kern et al. | 707/1 |
| 2006/0069605 A1* | 3/2006 | Hatoun | 705/9 |
| 2009/0048896 A1* | 2/2009 | Anandan | 705/9 |

* cited by examiner

*Primary Examiner* — Thomas Dixon
*Assistant Examiner* — Benjamin S Fields
(74) *Attorney, Agent, or Firm* — Park, Vaughan, Fleming & Dowler LLP; Laxman Sahasrabuddhe (57) ABSTRACT

Methods and apparatuses are described for creating and using full-kit tasks, monitoring the progress of full-kit tasks, determining full-kit dates, checking compliance of release conditions associated with full-kit tasks, and/or computing and reporting full-kit task delays. A full-kit task can be used in the project plan to represent the preparations that are required or recommended to be performed before executing a set of tasks. The full-kit task can be a zero-duration task that has a full-kit date and that includes a list of items which need to be completed by the full-kit date. The full-kit task is capable of being in one of the following states: not started, in progress, released, and completed. In some embodiments, the set of tasks associated with the full-kit task can only be started if the full-kit task is either in the released state or the completed state.

21 Claims, 10 Drawing Sheets

WINDOW 702

| ITEM # | DESCRIPTION | STATUS |
|---|---|---|
| 0 | PART 5-A | YES |
| 1 | PART 5-K | NO |
| 2 | MATERIAL 5-X | NO |
| 3 | PART 5-B | YES |
| 4 | PART 5-D | NO |
| 5 | MATERIAL 5-W | YES |
| 6 | PART 5-F | NO |
| 7 | PART 5-J | NO |

WINDOW
1252

| F. K. TASK ID | PR. NAME | F. K. TASK DESC. | F. K. DATE | STATUS | | % COMPLETE |
|---|---|---|---|---|---|---|
| S1 | SATURN | | 05-JUN-11 | CO | V | 100% |
| S2 | SATURN | | 10-JUN-11 | IP | V | 50% |
| S3 | SATURN | | 11-JUN-11 | NS | V | 0% |
| J1 | JUPITER | | 15-JUN-11 | RL | V | 90% |

FIG. 12B

WINDOW
1254

| TASK MGR. ID | NAME | % COMPLIANCE (CURR. WEEK) | % COMPLIANCE (PAST WEEKS) |
|---|---|---|---|
| TMID-1 | BOB | 100% | 95% |
| TMID-2 | JIM | 90% | 95% |
| TMID-3 | TOM | 95% | 80% |

FULL-KIT MANAGEMENT IN PROJECTS: COMPUTING THE FULL-KIT DELAY

FIELD

The present disclosure generally relates to project scheduling. More specifically, the present disclosure relates to full-kit management in projects.

BACKGROUND

Related Art

The ability to successfully complete projects on time is critical for any organization's success. Not surprisingly, organizations spend large amounts of resources to ensure that projects are properly planned and executed. Unfortunately, despite all of the resources spent on project planning and execution, very few projects complete on time and within budget.

In theory, properly planned projects should complete on time. However, in reality, project plans are inherently uncertain because the future is unpredictable. Many problems may arise during the execution of the project, which may cause the project plan to slip. For example, requirements may change, equipment may fail, vendors may not deliver on time, work may materialize more slowly than expected, approvals may not be granted on time, priorities may change, etc.

It is generally desirable to enable organizations to schedule projects to overcome the above-described problems, and to increase the likelihood that the projects will complete on time and under budget.

SUMMARY

Some embodiments described in this disclosure provide methods and apparatuses for creating and using full-kit tasks. Using full-kit tasks at appropriate points in the project can reduce uncertainties and dependencies that need to be managed, allowing smooth execution of a project without significant interruptions at every step. The term "phase" as used in this disclosure generally refers to an arbitrary collection of tasks. The term "phase" does not necessarily imply the creation or existence of a separate entity (e.g., a phase data structure) in the project management system.

In some embodiments, a system can receive a request to create a full-kit task for a set of tasks in a project or for the entire project. The project can include tasks whose interdependencies are capable of being represented using a task dependency network. In some embodiments, the set of tasks in the project can be associated with a phase. In response to the request, the system can create the full-kit task for the set of tasks, wherein the set of tasks can only be started when the full-kit task is in one of a set of pre-determined states. In some embodiments, the full-kit task can be a zero-duration task. In some embodiments, the full-kit task can be created based on a full-kit template.

In some embodiments, the full-kit task can be associated with a full-kit date, and the full-kit task can include a list of items which need to be completed by the full-kit date.

In some embodiments, the full-kit task is capable of being in one of the following states: not started, in progress, released, and completed. The set of pre-determined states can include the released state and the completed state.

Some embodiments described in this disclosure provide methods and apparatuses for determining a full-kit date for a full-kit task that is associated with one or more tasks. In some embodiments, a full-kit task can be associated with a phase or an entire project. In some embodiments, a system can determine a set of task chains associated with the full-kit task. Next, the system can determine a full-kit date for each task chain in the set of task chains by: summing task durations and buffers in the task chain, and subtracting a result of said summing from each contractual milestone or project due date that the chain feeds. The system can then set the full-kit date for the full-kit task to be equal to the earliest full-kit date from the determined full-kit dates.

Some embodiments described in this disclosure provide methods and apparatuses for checking compliance with a release condition of a full-kit task. In some embodiments, a system can display (e.g., by generating signals that can be provided to a computer monitor) a full-kit task window to a full-kit task manager. The system can allow the full-kit task manager to input or update the percentage completion for one or more full-kit tasks. In response to receiving an input from the full-kit task manager which indicates that the full-kit task is to be released, the system can release the full-kit task. The system can then determine whether or not a release condition is satisfied. Next, in response to determining that the release condition of the full-kit task is not satisfied, the system can generate a report that indicates that the full-kit task was released even though the release condition was not satisfied. In some embodiments, the report can include the percentage of full-kit tasks across one or more projects that were released in violation of the release condition. The percentage of full-kit tasks that violated the release condition can be plotted against time to show if compliance with the release condition is improving or degrading over time. In some embodiments, the report identifies the full-kit task manager, i.e., the report indicates that the full-kit task manager did not comply with the release condition.

In some embodiments, the release condition may specify a minimum percentage completion threshold for releasing the full-kit task. In these embodiments, the release condition is satisfied if the percentage completion of the full-kit task exceeds the minimum percentage completion threshold. In some embodiments, the release condition may specify that the full-kit task can be released if the number of items in the full-kit task that have been completed exceeds a threshold. In other words, in these embodiments, the release condition is satisfied if the number of items in the list which have been completed exceeds the threshold.

Some embodiments described in this disclosure provide methods and apparatuses for determining full-kit task delays. In some embodiments, at a first time instance (e.g., time T1), the system can determine whether or not the full-kit task is in one of the set of predetermined states. If the full-kit task is not in one of the set of predetermined states, the system can determine a full-kit task delay for the full-kit task by computing a first time difference between the first time instance and the full-kit date. On the other hand, if the full-kit task is in one of the set of predetermined states, the system can determine a second time instance (e.g., time T2) when the full-kit task entered one of the set of predetermined states, and determine the full-kit task delay for the full-kit task by computing a second time difference between the second time instance and the full-kit date.

In some embodiments, the system can generate a report based on the full-kit task delays. For example, in some embodiments, for each time bucket from a set of time buckets, the system can aggregate full-kit task delays of full-kit tasks whose full-kit dates fall within the time bucket, and display the aggregated full-kit task delay for each time bucket from the set of time buckets. The aggregated full-kit task delay can be plotted against time to show if full-kit performance is improving or degrading over time. In some embodiments, the system can aggregate the full-kit delay based on each checklist item, thereby enabling a user to identify the checklist items that caused the greatest amount of delay. In some embodiments, the system can display the trend of delay caused by a checklist item enabling user to see if full kitting of the checklist item is improving.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
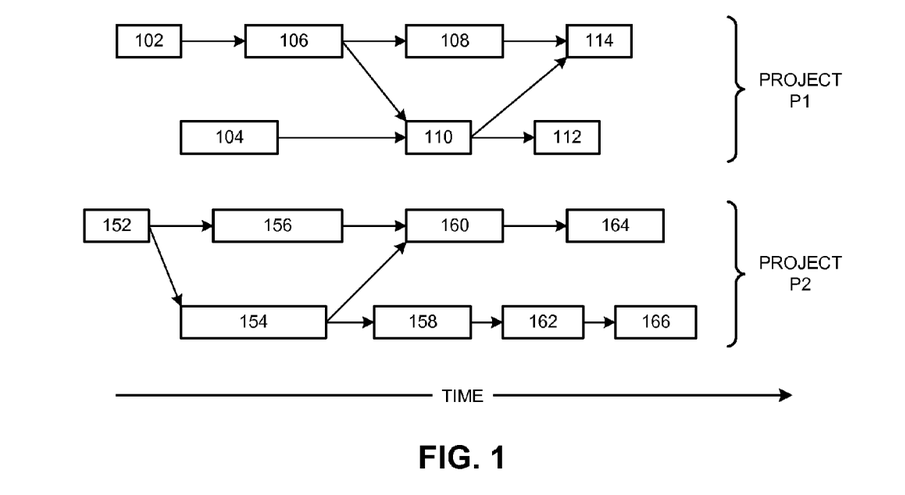
FIG. 1 illustrates multiple projects in accordance with some embodiments described in this disclosure.

FIG. 1 illustrates multiple projects in accordance with some embodiments described in this disclosure.

A project can generally be defined as a temporally bounded endeavor which is designed to achieve specific goals and objectives. A project is usually associated with a due date, i.e., a date by which a project needs to be completed. In some cases, the project must be completed on the due date, i.e., completing the project before the due date is not allowed. In other cases, the due date is an "on or before" due date, i.e., the project is allowed to be completed on the due date or before the due date. A project can be represented as a set of interdependent tasks. A task can generally be defined as a unit of work which needs to be performed within a specific time period. A task is usually associated with an owner, a set of resources that the task is expected to use, and a start time and an end time.

An organization typically needs to schedule multiple projects at any given time. For example, as shown in FIG. 1, an organization may have projects P1 and P2. Project P1 can include multiple tasks, such as tasks 102-114. Similarly, project P2 can also include multiple tasks, such as tasks 152-166. Note that the horizontal axis in FIG. 1 denotes time.

Each task in FIG. 1 is represented as a rectangle, where the left edge of the rectangle is associated with the task's start time, and the right edge of the rectangle is associated with the task's end time. The tasks can have interdependencies which can be represented using a task dependency network as shown in FIG. 1. A directed edge from task 102 to task 106 indicates that task 106 can be started only after task 102 has completed. Similarly, task 110 can be started only after tasks 104 and 106 have been completed because there are two directed edges from tasks 104 and 106 that are incident on task 110. Likewise, project P2's task dependency network shows that task 160 can be started only after tasks 156 and 154 have completed.

Figure 2:
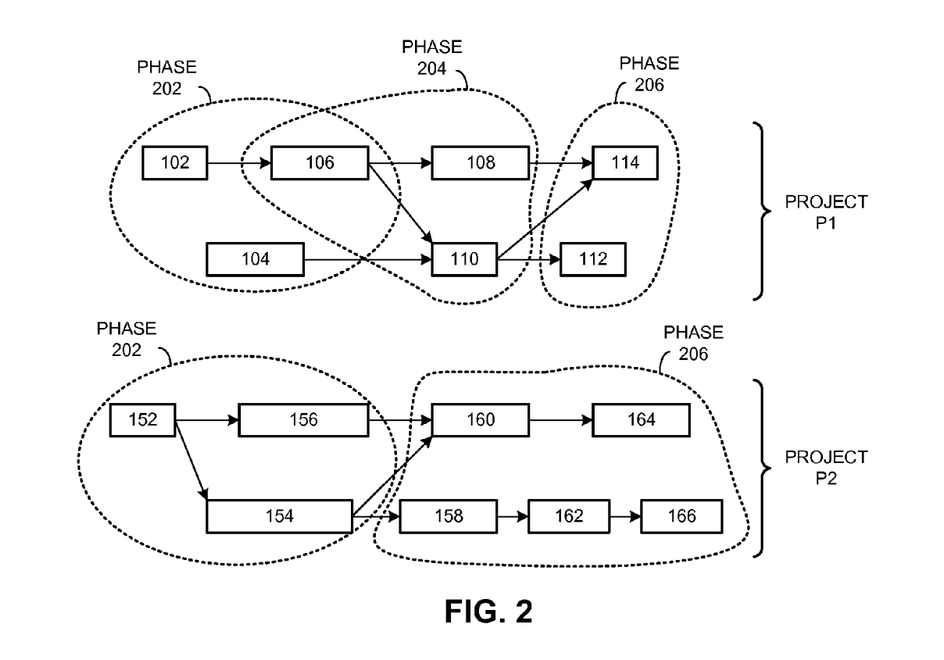
FIG. 2 illustrates how tasks can be associated with phases in accordance with some embodiments described in this disclosure.

FIG. 2 illustrates how tasks can be associated with phases in accordance with some embodiments described in this disclosure.

In general, a phase can be an arbitrary collection of tasks, and a task can be associated with one or more phases. Phase 202 includes tasks 102, 104, and 106. In other words, tasks 102, 104, and 106 are associated with phase 202. Similarly, phase 204 includes tasks 106, 108, and 110, and phase 206 includes tasks 112 and 114. Note that since the association between tasks and phases is arbitrary, two phases can share the same task. For example, phases 202 and 204 both include task 106. Tasks from different projects can be associated with the same phase. For example, tasks 102, 104, and 106 in project P1, and tasks 152, 154, and 156 in project P2, are associated with phase 202. Different projects may include different sets of phases. For example, project P1 includes phases 202, 204, and 206. However, project P2 includes phases 202 and 206, but does not include phase 204.

Figure 3:
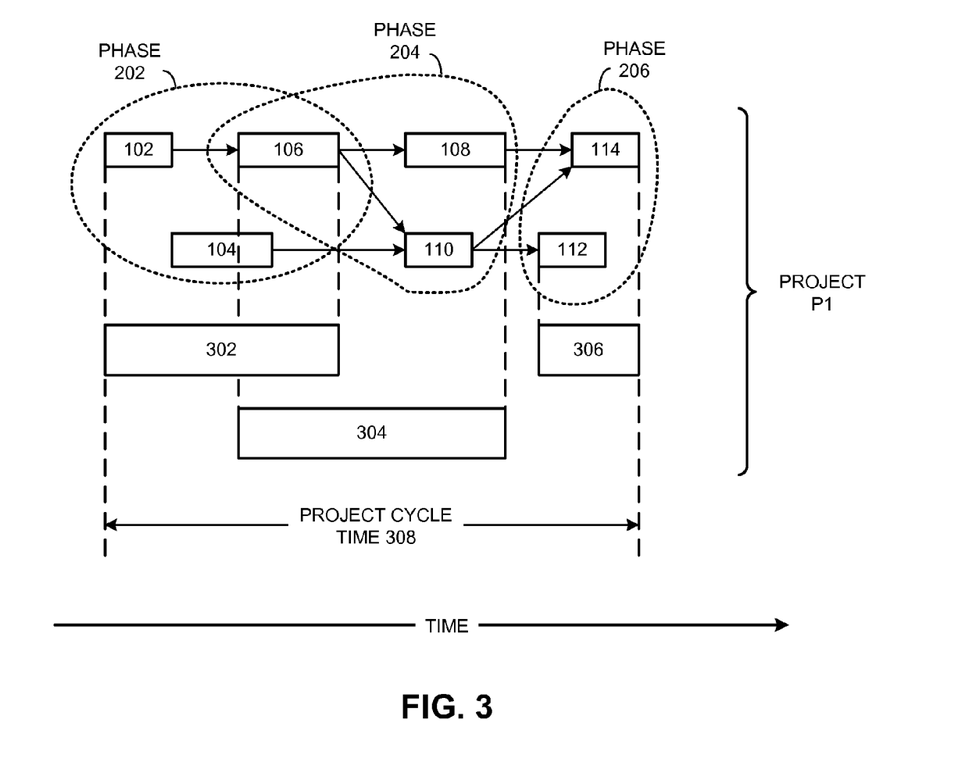
FIG. 3 illustrates how a project can be represented using phases in accordance with some embodiments described in this disclosure.

FIG. 3 illustrates how a project can be represented using phases in accordance with some embodiments described in this disclosure.

Once tasks have been associated with phases, a project can be represented in terms of phases. For example, project P1 can be represented as a collection of phases 202, 204, and 206. Each phase can be illustrated as a rectangle, where the left edge of the phase denotes the start time of the phase, and the right edge denotes the end time of the phase. For example, rectangles 302, 304, and 306 can be used to visually represent phases 202, 204, and 206, respectively. The system may also represent interdependencies between phases explicitly (e.g., by using directed edges) instead of the interdependencies being represented implicitly based on the interdependencies between the tasks.

A project's cycle time is defined as the duration for which the project is active. Specifically, the project's cycle time is equal to the time interval between the earliest task start time and the latest task end time in the project. For example, as shown in FIG. 3, project cycle time 308 for project P1 is equal to the time interval from task 102's start time to task 114's end time. The project plan shown in FIG. 3 does not show buffers. If buffers had been shown in the project plan, then the cycle time would have also included the buffers.

Each task can be associated with one or more task attribute values. A task attribute value can generally be the value of any task attribute that is associated with a task. For example, task attribute values associated with a task can include a phase that includes the task, the task manager who owns the task, and a resource (e.g., a skill or machinery) that is assigned to the task, the task description for the task, and a "help needed" item that the task manager specified to resolve an issue with the task.

In some embodiments, a buffer can be added to one or more tasks and/or to one or more phases and/or to contractual milestones and/or to project milestones to accommodate any delays that may occur during execution.

Figure 4A:
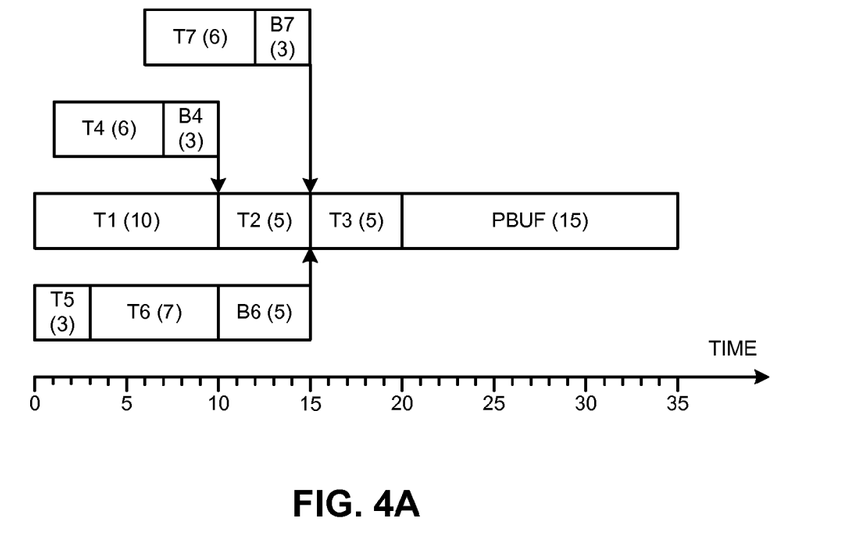
FIGS. 4A and 4B illustrate how buffers can be added and how buffer consumptions can be determined in accordance with some embodiments described in this disclosure.
Figure 4B:
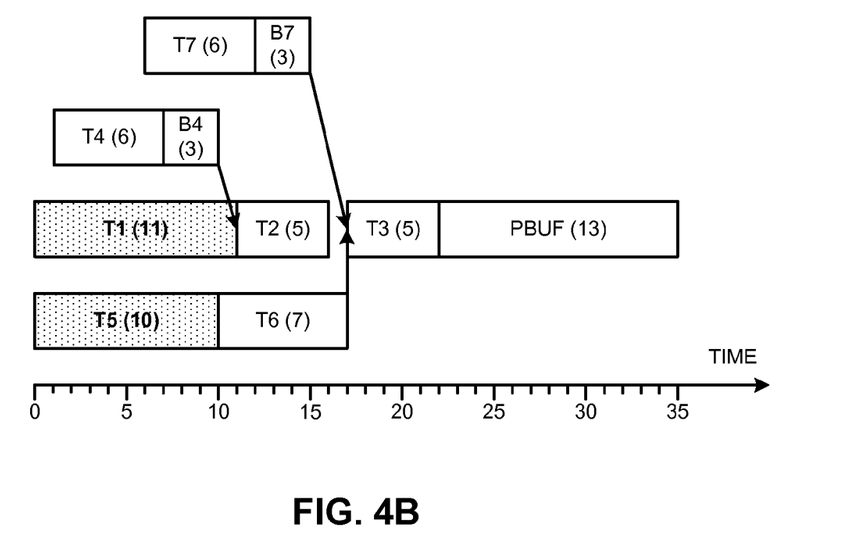

FIGS. 4A and 4B illustrate how buffers can be added and how buffer consumptions can be determined in accordance with some embodiments described in this disclosure.

FIG. 4A illustrates a task dependency network for a project. The values in the brackets indicate the durations the tasks are expected to execute or the sizes of the buffers. For ease of discourse we will assume that all time amounts shown in FIG. 4A are in days.

Tasks T1, T2, T3, T4, T5, T6, and T7 are expected to take 10, 5, 5, 6, 3, 7, and 6 days, respectively, to complete. Feeding buffers B4, B6, and B7 have been added after tasks T4, T6, and T7, respectively, to accommodate any unanticipated delays during execution. Note that the feeding buffers B4, B6, and B7 are 3, 5, and 3 days long, respectively. Finally, the entire project has a project buffer (PBUF) which is 15 days in length. (Note that the project buffer is typically 50% of the longest task chain. In this case, that would mean that the project buffer should be 10 days long. However, for ease of discourse, a slightly longer project buffer—15 days instead of 10 days—has been assumed in this example.)

The arrows in FIG. 4A indicate the interdependencies among the tasks. Specifically, task T2 can only be started after task T4 has completed. Further, task T3 can only be started after tasks T6 and T7 have completed. If a task is adjacent to another task, that also indicates an interdependency. For example, task T3 can only be started after task T2 has completed, which in turn, can only be started after task T1 has completed.

FIG. 4B illustrates how the buffer consumption may change over time in accordance with some embodiments described in this disclosure.

Suppose that, at the end of day 0, the task managers for tasks T1 and T5 indicate that task T1 and T5 are going to be delayed and are expected to complete in 11 days and 10 days, respectively. At the end of day 0, the impact on the project buffer consumption due to task chains C1, C2, C3, and C4 is 0, 0, 1, and 2, respectively. Task chain C4 has the maximum impact (2 days) on the project buffer consumption, and this is shown in FIG. 4B by the decrease in the project buffer from 15 days to 13 days.

Various preparatory actions may be required before a collection of tasks, i.e., a phase, is executed. For example, in a maintenance, repair, and overhaul environment, it may be desirable to gather the appropriate parts and materials before the reassembly phase is executed, or in an engineer-to-order environment, it may be desirable to gather all components, internal and vendor-supplied, before manufacturing phase begins.

In some embodiments described in this disclosure, a full-kit task can be included in the project plan to represent the preparations that are required or recommended before executing a phase. Specifically, a system can present a project plan to a user via a GUI. Next, the system can receive a request from a user to create a full-kit task in the project plan. For example, the user may select a task via the GUI, and indicate, via the GUI, that the selected task is to be tagged as a full-kit task.

In some embodiments, a full-kit task can have a non-zero-duration, just like any other task. The actions associated with a full-kit task can have highly variable durations; therefore, keeping track of the duration of a full-kit task in the project network during execution can inject a large amount of uncertainty into the project plan. Therefore, in some embodiments, for purposes of monitoring project execution, a full-kit task can be represented using a zero-duration task (also called a full-kit point) in the task dependency network, and the system can return an error if the full-kit task created by a user has a non-zero-duration. In these embodiments, the actions associated with the full-kit are captured in a checklist, and an expected completion date is specified for the full-kit task. In these embodiments, the full-kit task may be associated with an internal duration value based on the expected completion date for purposes of determining the impact of a full-kit delay on buffer consumptions.

Each full-kit task can be associated with a phase, i.e., a collection of tasks. Note that the phases that are used for imposing a WIP (work-in-process) limit may or may not be the same as the phases that are associated with full-kit tasks.

The resources used in checklist items that are associated with a full-kit task are different from the resources that are used in a project. For example, to perform a task, we may need a particular piece of equipment (e.g., test equipment or a paint shop). Such pieces of equipment are typically called resources, and usually only a limited number of tasks may be able to simultaneously use any given resource at any given time. Therefore, a task scheduling process may perform scheduling to ensure that no more than a pre-determined number of tasks and/or phases and/or projects use a given resource at any given time.

In order to prevent unnecessary delays, it may be desirable to gather the enablers (e.g., materials, procedures, approvals, etc.) that are expected to be used during a task and/or phase before the task and/or phase needs them. Note that such enablers (e.g., the wires that are expected to be used during a test or the test procedure to perform the testing) are different from the resources (e.g., the test equipment). Conventional techniques do not provide a convenient way to batch all of the enablers that are needed for executing a phase or a project without significantly increasing the complexity of the project plan. Some embodiments described in this disclosure provide methods and systems for supporting full-kit tasks within project plans so that the system can keep track of the availability of enablers that are expected to be used during a phase or a project.

The above-described description and representation of a full-kit task is for illustration purposes only and is not intended to limit the scope of the disclosed embodiments. Various modifications to the disclosed embodiments will be readily apparent to those skilled in the art. For example, in some embodiments, a full-kit task may be implemented using a data structure that stores at least the following two data items: a time value that indicates the time by which the full-kit task is to be completed, and a phase identifier which identifies the phase associated with the full-kit.

Figure 5:
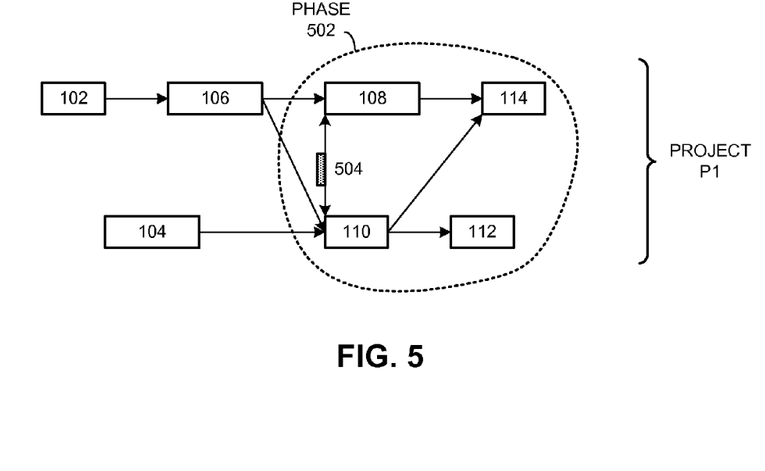
FIG. 5 illustrates a full-kit task in accordance with some embodiments described in this disclosure.

FIG. 5 illustrates a full-kit task in accordance with some embodiments described in this disclosure.

Project P1 can include tasks 102-114 which have interdependencies as illustrated in FIG. 5A. Phase 502 can include tasks 108-114. For example, phase 502 may correspond to a repair phase in project P1. A zero-duration full-kit task 504 may be created to represent the preparations that need to be made before phase 502 begins execution. Task dependencies can be created between full-kit task 504 and tasks 108 and 110 in phase 502 to capture the fact that full-kit task 504 must be completed before phase 502 can begin. As will be explained below, in some embodiments, a phase may begin execution before the associated full-kit task is completed.

Figure 6:
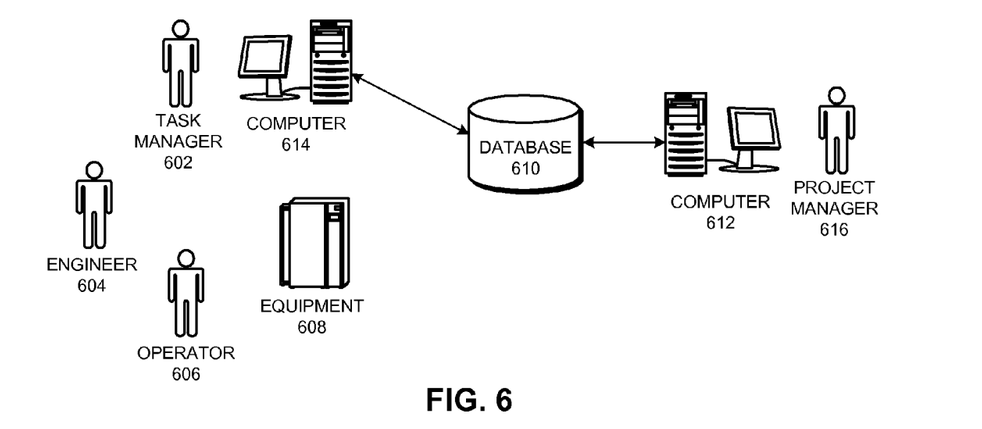
FIG. 6 illustrates a system in accordance with some embodiments described in this disclosure.

FIG. 6 illustrates a system in accordance with some embodiments described in this disclosure.

Task manager 602 may own a task and/or a phase which requires multiple resources, such as engineer 604, operator 606, and equipment 608. Task manager 602 may also own a full-kit task (called a full kit manager) which requires the task manager to complete a list of items and/or perform other preparatory tasks for the task and/or phase. Task manager 602 may periodically, e.g., every day, update the status of one or more tasks and/or full-kit tasks. Specifically, task manager 602 can update the status of a task and/or a full-kit task using a GUI in computer 614. Computer 614 can store the status updates in database 610. Subsequently, another user, e.g., project manager 616, can determine the health of the project by analyzing the status update information stored in database 610. For example, project manager 616 can use computer 612 to determine buffer consumptions for task chains using the status update information stored in database 610. Project manager 616 can also use computer 612 to determine the status of a full-kit task.

In some embodiments, the system can perform post-facto analysis on the status update information stored in database 610 by using status update information that relates to completed projects. Specifically, the post-facto analysis can identify and prioritize the causes for delays that occurred in completed projects. In a variation, the system can perform post-facto analysis as each project completes, so that the organization has an up-to-date picture of the issues (resources/parts/materials shortage, process inefficiencies, etc.) that are likely to cause project delays.

Figure 7:
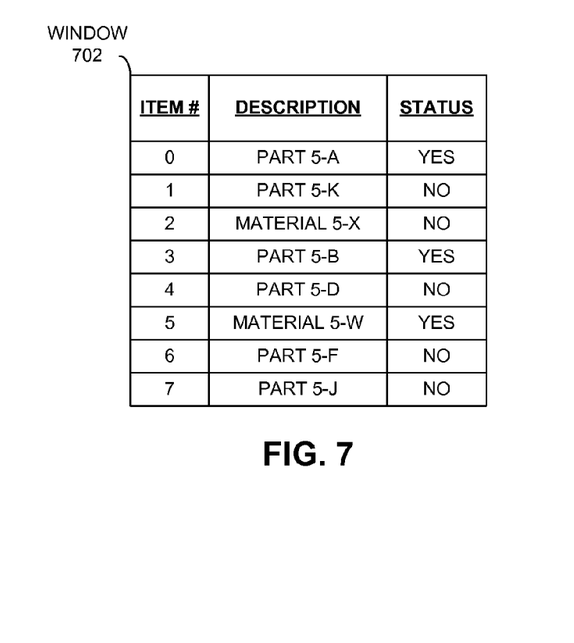
FIG. 7 illustrates a window of a GUI that a task manager can use to update the status of a task in accordance with some embodiments described in this disclosure.

FIG. 7 illustrates a window of a GUI that a task manager can use to update the status of a task in accordance with some embodiments described in this disclosure.

The system may present window 702 of a GUI to a full-kit task manager to enable the task manager to update the status of the full-kit task. In some embodiments, window 702 may display information in a tabular format. In some embodiments, window 702 may display full kit tasks that have a full kit date within a given time window. The time window can be based on user input. Specifically, each row in the table may be associated with a particular preparatory item. For example, some rows may be associated with certain parts (e.g., parts 5-A, 5-K, etc.), and some rows may be associated with certain materials (e.g., materials 5-X, 5-W, etc.). Each row may also include a column that indicates the status of the item, e.g., whether or not the item has been acquired. Specifically, a "YES" may indicate that the item has been completed; a "NO" may indicate that the item has not been completed; and a percentage value may indicate the progress that has been made in obtaining the item. Window 702 has been presented for illustration purposes only and is not intended to limit embodiments of the present invention to the forms disclosed.

As the full-kit task manager obtains the various items in the checklist, the task manager can update the status of the items in the full-kit task. If the full-kit task is completed before the full-kit date, then the associated phase can begin execution as planned. However, if the full-kit task is not completed before the full-kit date, the associated phase may be delayed. In some embodiments, the system can keep track of the delay caused by a full-kit task.

In some embodiments, the status of a regular task, i.e., not a full-kit task, can be one of the following: not started (NS), in progress (IP), and completed (CO). At regular intervals (e.g., on a daily basis), a task manager may use a GUI to update the progress of one or more tasks owned by the task manager. When a task or phase is created, the system can initialize its status to NS. Once a task or phase has started, the task manager can change the status to IP. Finally, when a task or phase completes, the task manager can change the status to CO.

Note that not all of the items in the full-kit checklist may be required to begin the phase. Therefore, for full-kit tasks, the system may allow a fourth status: released (RL). This status can be used to allow a phase to begin execution before the full-kit task has been completed. The system can keep track of project-related metrics (e.g., delay, buffer consumption, etc.) associated with full-kit tasks that have a released status. In this manner, the system can prevent an in-progress full-kit task from unnecessarily delaying a project, and at the same time, enable a user (e.g., a project manager) to track the progress of the full-kit task to help minimize the amount of delay, if any, caused by the full-kit task in the future.

In some embodiments, it may be desirable to complete a full-kit task just before the associated phase starts. When a project plan is created, it may include aggressive due dates for each task. A buffer may be included at various points in the project plan to account for any unforeseen delays. In some embodiments, the full-kit date for the full-kit task can be determined by working backward from the project end date. Note that the resulting full-kit date may be later than the full-kit date that would have been determined if the full-kit date had been calculated by working forward from the project start date based on the aggressive due dates for each task.

In some embodiments, the full-kit date is not moved when the project buffer is partially or fully consumed, because the buffer consumption may decrease if a subsequent task finishes before its due date. In some embodiments, the system may prompt a full-kit task manager to define the checklist items for a full-kit task during creation of the full-kit task. For example, in a maintenance, repair, and overhaul environment, the system may prompt the full-kit task manager to make a list of the parts and materials that are expected to be used during the execution of a phase. Before a phase starts execution, or as the phase executes, the full-kit task manager may update the percentage completion of the full-kit task. The percentage completion can be based on manual input, or it may be automatically updated based on the number of items that have been checked in the checklist.

In general, the phase cannot start unless the full-kit task is completed, i.e., the full-kit task is in the CO state. However, if a phase has a long duration, the full-kit task may not be complete when the phase needs to start. In such situations, the task manager can "release" the full-kit task, thereby allowing the associated phase to start by allowing all tasks that are dependent on the full-kit task to proceed. The full-kit task can then be completed in parallel once all checklist items are procured.

In some embodiments, if no work has started on the full-kit task, and the project date is pushed back, then the full-kit date for the full-kit task is also pushed back accordingly. However, in these embodiments, if work on the full-kit task has already started, i.e., if at least one checklist item has been procured, then the full-kit date of the full-kit task is not changed automatically even when the project due date is pushed back (i.e., postponed). In some embodiments, changing the full-kit date may be privileged, i.e., a full-kit task manager may not have permissions to change the full-kit date of the full-kit task. In some embodiments, if the project due date is pushed out, the system may allow a user (e.g., a full-kit task manager) to select a new full-kit date from a set of full-kit dates.

Figure 8:
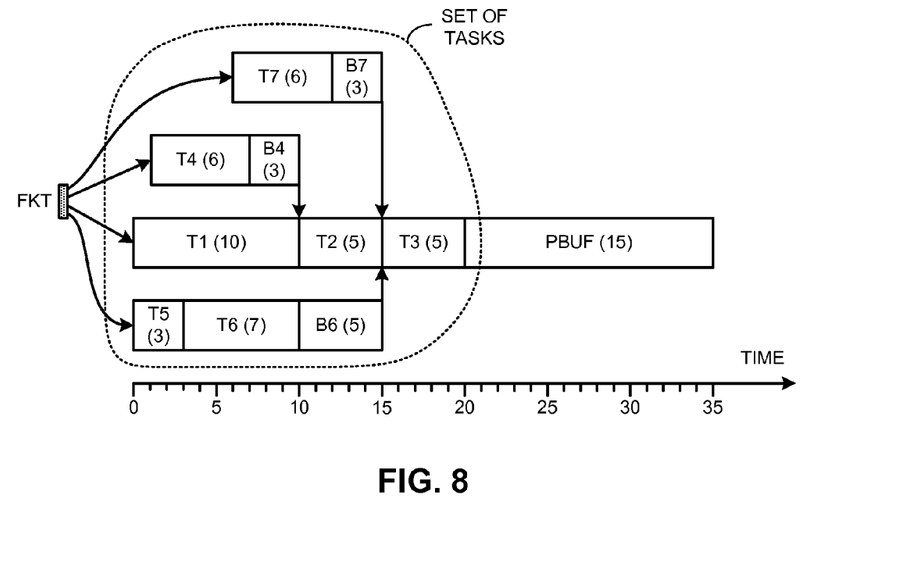
FIG. 8 illustrates how a full-kit date for a full-kit task can be determined in accordance with some embodiments described in this disclosure.

FIG. 8 illustrates how a full-kit date for a full-kit task can be determined in accordance with some embodiments described in this disclosure.

As in FIG. 4A, tasks T1, T2, T3, T4, T5, T6, and T7 are expected to take 10, 5, 5, 6, 3, 7, and 6 days, respectively, to complete. Feeding buffers B4, B6, and B7 have been added after tasks T4, T6, and T7, respectively, to accommodate any unanticipated delays during execution. Note that the feeding buffers B4, B6, and B7 are 3, 5, and 3 days long, respectively. Finally, the entire project has a project buffer (PBUF) which is 15 days in length.

Full-kit task FKT can be associated with the set of tasks T1-T7. The full-kit date of full-kit task FKT can be determined as follows. First, task chains can be identified in the set of tasks. Each task chain may feed a project buffer or a contractual milestone buffer. There are four task chains in FIG. 8: a first task chain (C1) that includes tasks T3 and T7; a second task chain (C2) that includes tasks T3, T2, and T4; a third task chain (C3) includes tasks T3, T2, and T1; and a fourth task chain (C4) that includes tasks T3, T6, and T5.

For each task chain, a full-kit date can be determined by first computing a sum of the task durations and the required buffers in the task chain, and then subtracting this sum from the project end date. For example, for task chain C1, the sum of the task durations and the required buffers is equal to 16.5=6 (task duration of T7)+3 (required buffer of task T7)+5 (task duration of T3)+2.5 (required buffer of task T3). Therefore, the full-kit date based on task chain C1 is at time 18.5=35 (the project completion time)−16.5 (sum of task durations and required buffers). Similarly, the full-kit dates based on task chains C2, C3, and C4 are at times 11, 5, and 12.5.

Next, the system can determine the earliest full-kit date from the set of full-kit dates associated with the task chains. For example, based on the above computations, the earliest full-kit date is at time 5. This full-kit date can then be used as the full-kit date for the full-kit task.

Once full-kit tasks with appropriate full-kit dates have been inserted into the project schedule, the system can track compliance of the full-kit task during project execution. Specifically, each full-kit task may be associated with a release condition which must be satisfied before the full-kit task can be released. In some embodiments, the release condition can be a percentage threshold, e.g., the full-kit task can only be released if the full-kit task is at least 80% complete. In some embodiments, the condition may identify a subset of items in the full-kit task which need to be checked before the full-kit task can be released.

The full-kit task manager can check items in the full-kit task as the items are completed. The system can determine whether or not a full-kit task is in compliance with the release condition, and generate a compliance report accordingly (e.g., on a daily basis). Specifically, the compliance report can list the full-kit tasks that were released before an associated release condition was satisfied. The compliance report may also identify the full-kit task managers associated with the full-kit tasks that are not in compliance.

Once a full-kit task crosses its full-kit date, a delay can be measured against the full-kit task. In some embodiments, the system can keep track of the amount of delay accumulated on full-kit tasks that had a full-kit date during a particular time bucket. For example, if the size of the time bucket is one month, then for a given month, the system can determine the aggregate amount of delay accrued against all full-kit tasks that were due in that month. In some embodiments, the system can display the delay information using a bar graph.

Figure 9:
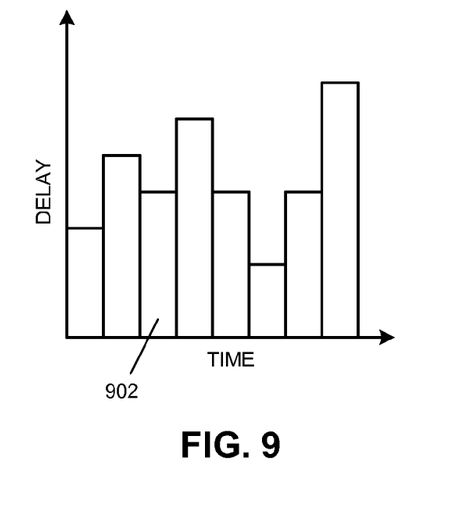
FIG. 9 illustrates a bar graph that shows the aggregate full-kit task delay for each time bucket in accordance with some embodiments described in this disclosure.

FIG. 9 illustrates a bar graph that shows the aggregate full-kit task delay for each time bucket in accordance with some embodiments described in this disclosure.

The bar graph illustrated in FIG. 9 shows the aggregate delay of full-kit tasks whose full-kit dates were in eight different time buckets. A time bucket can generally refer to a period of time. In general, the time buckets can correspond to time periods that are of fixed or variable lengths, and that may or may not overlap with each other. In some embodiments, each bar in the bar graph can correspond to a fixed, non-overlapping time period. For example, each bar in FIG. 9 can correspond to a particular month, e.g., bar 902 can correspond to the month of March, and the height of bar 902 can correspond to the aggregate delay accrued against full-kit tasks that were due in March.

The bar graph in FIG. 9 is for illustration purposes only. Various modifications to the disclosed embodiments will be readily apparent to those skilled in the art.

For example, in some embodiments, graphical representations other than a bar graph can also be used to display the information. Further, in some embodiments, the system may display the trend in the aggregate full-kit task delay across all delayed full-kit tasks. Specifically, in these embodiments, if the bucket size is one month, then the system can show a bar graph in which each bar is associated with a time bucket, and the height of the bar represents the aggregate full-kit task delay across all delayed full-kit tasks (regardless of the full-kit dates of the full-kit tasks). This bar graph may help illustrate the trend of the aggregate full-kit task delay across all delayed full-kit tasks. In yet another embodiment, the system may display the total number of delayed full-kit tasks instead of displaying the aggregate delay.

In some embodiments, the system can aggregate the full-kit task delay on a per-checklist item basis. The aggregation can be performed at a project level or at an organization level (i.e., by aggregating the delay across multiple projects in the organization). Specifically, each project can have multiple full-kit tasks. Each full-kit task may have multiple checklist items. A particular checklist item may appear in multiple full-kit tasks across multiple projects. If a particular full-kit task is delayed, the entire delay or a part of the delay can be accrued against each unchecked checklist item in the full-kit task. The system can then aggregate the accrued delays for each checklist item across a set of full-kit tasks and/or projects.

Specifically, in some embodiments, the system can allow the user to select a set of full-kit tasks and/or projects for which the delay is to be aggregated on a per checklist item basis. The system can then present a list of checklist items sorted by their aggregate delays. When the user selects a particular checklist item, the system can present a drill-down view of the aggregated delay, e.g., a view that displays the aggregated delay for the given checklist for each time bucket.

In some embodiments, the system may have a set of full-kit task templates or a set of project templates to facilitate the creation of full-kit tasks. Specifically, the system may have one or more full-kit task templates or project templates for different types of full-kits or projects, e.g., the system may have a full-kit task template or a project template for an airline maintenance, repair, and overhaul phase. The full-kit task template or project template may have a ready-made checklist and also a pre-defined release condition. To facilitate the creation of a full-kit task, the system can allow a user to select a full-kit task template or a project template and customize it based on the specific needs of the case at hand.

Figure 10:
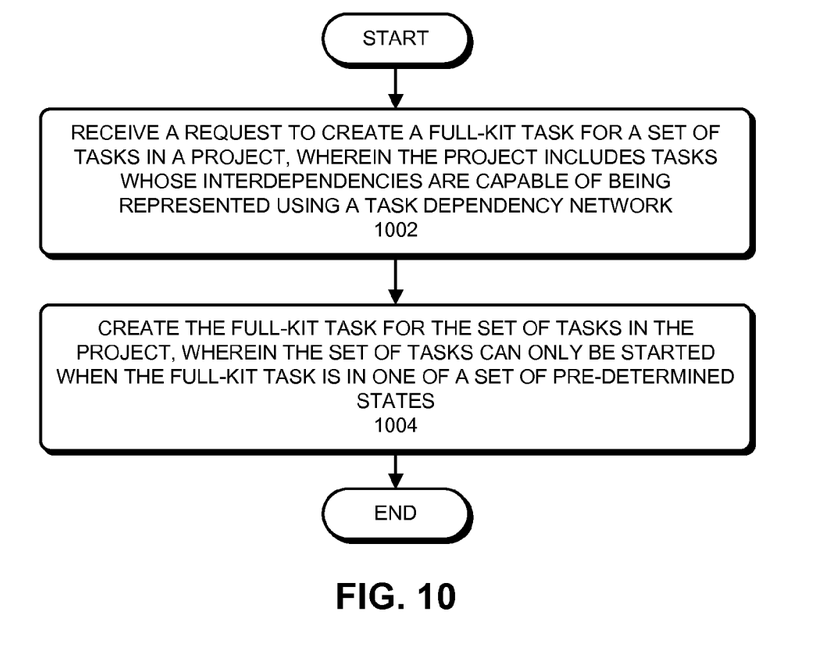
FIG. 10 presents a flow chart that illustrates a process for creating a full-kit task in accordance with some embodiments described in this disclosure.

FIG. 10 presents a flow chart that illustrates a process for creating a full-kit task in accordance with some embodiments described in this disclosure.

The process can begin with a system receiving a request to create a full-kit task for a set of tasks in a project, wherein the project includes tasks whose interdependencies are capable of being represented using a task dependency network (operation 1002). In some embodiments, the set of tasks can be associated with a phase. In some embodiments, the request can also specify a full-kit template to use for creating the full-kit task.

The system can then create the full-kit task for the phase in the project, wherein the set of tasks can only be started when the full-kit task is in one of a set of pre-determined states (operation 1004). In some embodiments, the full-kit task is capable of being in one of the following states: not started, in progress, released, and completed. In some embodiments, the set of pre-determined states can include the released state and the completed state. In some embodiments, the full-kit task is a zero duration task.

The full-kit task can be associated with a full-kit date, and can include a list of items which need to be completed by the full-kit date. In some embodiments, the request can specify an expected completion date, i.e., the full-kit date, for the full-kit task. In some embodiments, the system can automatically determine a full-kit date. For example, in some embodiments, the system can determine the full-kit date using a process that was described in reference to FIG. 8.

Figure 11:
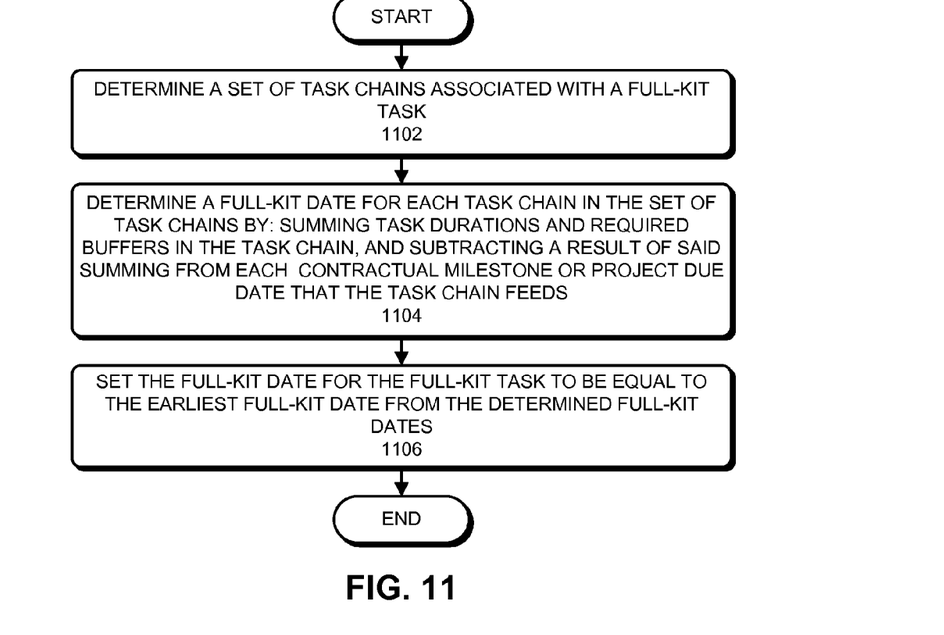
FIG. 11 presents a flow chart that illustrates a process for determining a full-kit date for a full-kit task that is associated with a set of tasks in accordance with some embodiments described in this disclosure.

FIG. 11 presents a flow chart that illustrates a process for determining a full-kit date for a full-kit task that is associated with a set of tasks in accordance with some embodiments described in this disclosure.

The process can begin with a system determining a set of task chains associated with a full-kit task (operation 1102). For example, as described above in reference to FIG. 8, the system can determine the four task chains C1-C4 based on the set of tasks associated with the.

Next, the system can determine a full-kit date for each task chain in the set of task chains by: summing task durations and required buffers in the task chain, and subtracting a result of said summing from each contractual milestone or project due date that the task chain feeds (operation 1104). For example, the system can determine the full-kit dates for task chains C1-C4 as described above in reference to FIG. 8.

The system can then set the full-kit date for the full-kit task to be equal to the earliest full-kit date from the determined full-kit dates (operation 1106). For example, as described above in reference to FIG. 8, the system can set the full-kit date for the full-kit task to be equal to 5, which is the earliest full-kit date from the set of full-kit dates associated with the task chains.

Figure 12A:
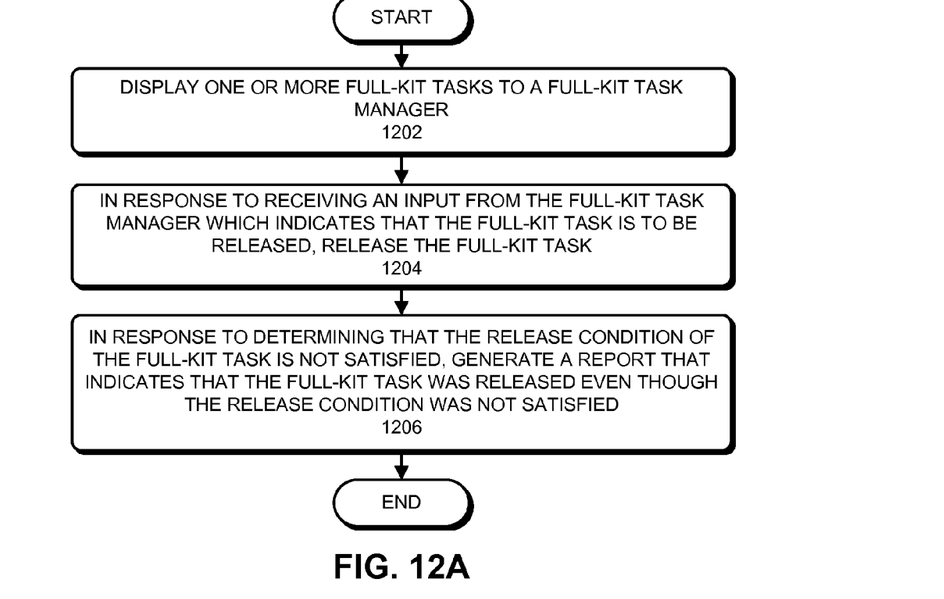
FIG. 12A presents a flow chart that illustrates a process for checking compliance with a release condition of a full-kit task in accordance with some embodiments described in this disclosure.

FIG. 12A presents a flow chart that illustrates a process for checking compliance with a release condition of a full-kit task in accordance with some embodiments described in this disclosure.

The process can begin with a system displaying one or more full-kit tasks to a full-kit task manager (operation 1202). Specifically, in some embodiments, the system may display the one or more full-kit tasks via a window of a GUI.

Figure 12B:
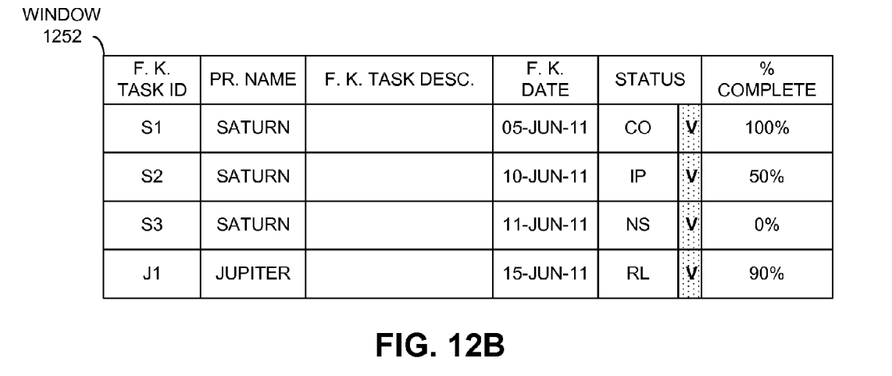
FIG. 12B illustrates a window of a graphical user interface (GUI) in accordance with some embodiments described in this disclosure.

FIG. 12B illustrates a window of a GUI in accordance with some embodiments described in this disclosure.

Full-kit task window 1252 can display information related to four full-kit tasks in a tabular format. Each row can contain information corresponding to a full-kit task. Column "F-K TASK ID" can contain an identifier for the full-kit task; column "PR. NAME" can contain the project name associated with the full-kit task; column "F-K TASK DESC." can contain a description of the full-kit task; and column "STATUS" can contain the status of the full-kit task. Column "% COMPLETE" can contain a value that indicate the percentage completion of the associated full-kit task. In some embodiments, the system may allow the user to change the percentage completion value via window 1252. In other embodiments, the system may require the user to open a separate window to update the percentage completion value of a full-kit task.

As shown in FIG. 12B, the statuses of full-kit tasks S1, S2, S3, and J1 are "CO," "IP," "NS," and "RL," respectively. Each cell in the status column can include a drop-down menu that a full-kit task manager can use to change the status of a full-kit task. For example, to release full-kit task S2, the full-kit task manager may click on the drop-down menu and select the status "RL." In some embodiments, the contents of the drop-down menu may be dependent on whether or not a release condition for the full-kit task has been met. Specifically, if the release condition has not been met, the drop-down menu may not display the "RL" status, thereby preventing the full-kit task manager from selecting the "RL" status.

Upon viewing the information in the full-kit window, the full-kit task manager may provide input to the system via the GUI. In response to receiving an input from the full-kit task manager which indicates that the full-kit task is to be released, the system can release the full-kit task (operation 1204).

In some embodiments, if the full-kit task is not in either the "CO" or "RL" state, the system may not allow a user to change the status of a task in the phase associated with the full-kit task from the "NS" state to another state. Once a full-kit task has either been completed or released, the system can allow the user to change the status of a task in the phase associated with the full-kit task from the "NS" state to another state, e.g., to the "IP" state. In this manner, the system can use the full-kit task to ensure that tasks in the phase associated with the full-kit task cannot be started without completing or releasing the full-kit task.

As described above, a full-kit task may be associated with a release condition. In general, it is desirable to satisfy the release condition before releasing the full-kit task. However, in some embodiments, the system may allow a full-kit task manager to be released even when the release condition has not been met. In such embodiments, when a full-kit task is released, the system can determine whether or not the release condition has been satisfied. In response to determining that the release condition of the full-kit task is not satisfied, the system can generate a report that indicates that the full-kit task was released even though the release condition was not satisfied (operation 1206).

The report can then be used to perform analysis of the full kit process. For example, the report can be used to identify non-compliant full-kit task managers and/or projects that are associated with full-kit tasks that were released before the release condition was satisfied. Since the release condition was not satisfied, one or more tasks in the phase may experience delays, e.g., because a particular part or material was not available when it was needed. This information can be used to ensure that the full-kit task manager complies with the release condition in the future. On the other hand, none of the tasks in the phase may experience a delay because of the full-kit task being prematurely released. In this case, the project manager may conclude that the release condition was too stringent, and make appropriate changes to the release condition.

Figure 12C:
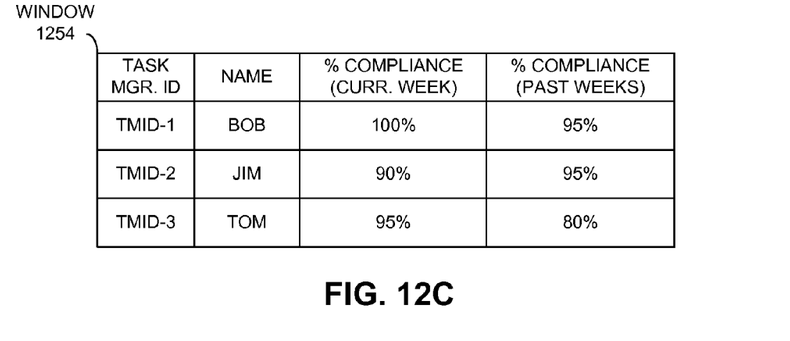
FIG. 12C illustrates a window of a GUI that shows a full-kit release condition compliance report in accordance with some embodiments described in this disclosure.

FIG. 12C illustrates a window of a GUI that shows a full-kit release condition compliance report in accordance with some embodiments described in this disclosure.

Window 1254 can display information related to full-kit release condition compliance in a tabular format. Each row can correspond to a full-kit task manager. Columns "TASK MGR. ID" and "NAME" can contain the identifier (e.g., employee number) and the name, respectively, of a full-kit task manager. Columns "% COMPLIANCE (CURR. WEEK)" and "% COMPLIANCE (PAST WEEKS)" can contain the percentage compliance of a given task manager over the current measurement period and over past measurement periods, respectively. The percentage compliance of a full-kit task manager over a given measurement period can be equal to the percentage of full-kit tasks that were released by the full-kit task manager in compliance with the release condition of the total number of full-kit tasks that were released by the full-kit task manager during the measurement period.

Figure 12D:
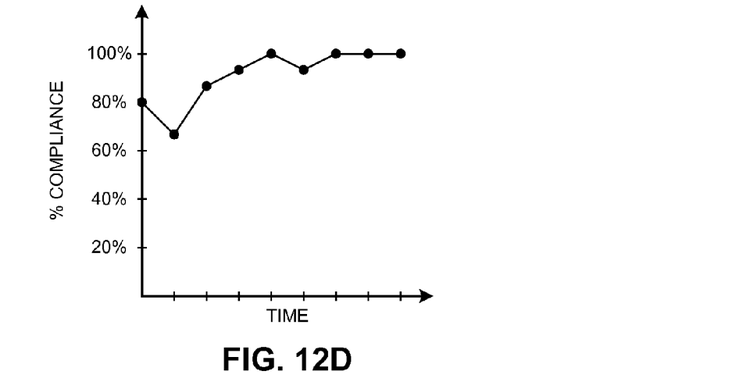
FIG. 12D illustrates a line graph that shows the variation of full-kit release condition compliance against time in accordance with some embodiments described in this disclosure.

FIG. 12D illustrates a line graph that shows the variation of full-kit release condition compliance against time in accordance with some embodiments described in this disclosure.

The line graph illustrated in FIG. 12D may correspond to the percentage compliance with the full-kit release condition for a full-kit task manager over time. Alternatively, the line graph may correspond to the compliance with the full-kit release condition for a set of projects over time.

A phase can begin execution after other tasks on which the phase depends are completed and after any associated full-kit tasks have been completed or released. For example, phase 502 shown in FIG. 5 can begin execution after tasks 104 and 106 have been completed and full-kit task 504 has either been completed or released. In some cases, a full-kit task may be the only reason preventing a phase from beginning execution. For example, in FIG. 5, suppose tasks 104 and 106 have been completed, but full-kit task 504 has not been completed or released. In this situation, at least a part of the total delay experienced by phase 502 will be attributable to full-kit task 504. In some embodiments, the system can compute full-kit task delays and generate one or more reports based on the full-kit task delays. A report can generally be any form of data representation that facilitates analysis, e.g., lists, histograms, pie-charts, graphs, etc.

Figure 13A:
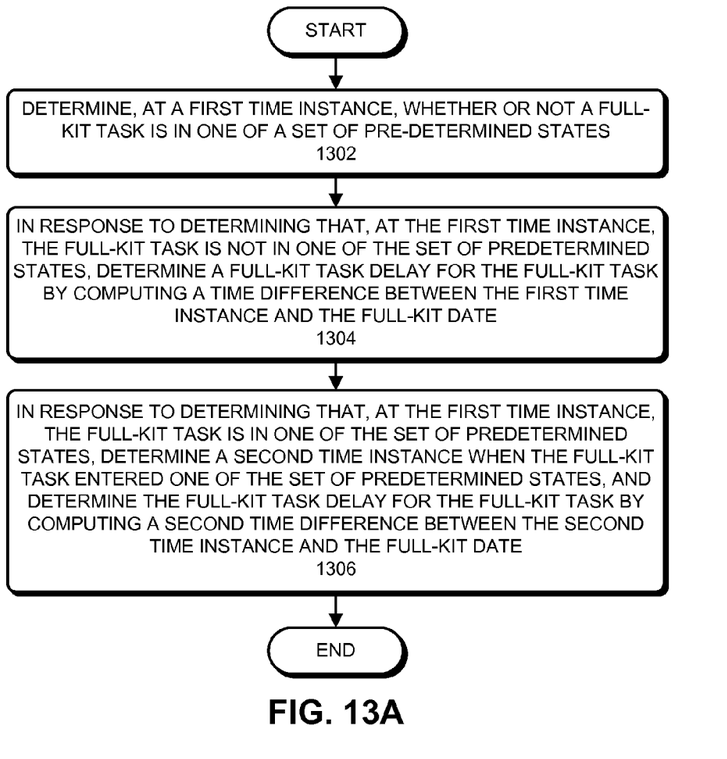
FIG. 13A presents a flow chart that illustrates a process for determining full-kit task delays in accordance with some embodiments described in this disclosure.

FIG. 13A presents a flow chart that illustrates a process for determining full-kit task delays in accordance with some embodiments described in this disclosure.

The process can begin with a system determining, at a first time instance, whether or not a full-kit task is in one of a set of pre-determined states (operation 1302). Next, in response to determining that, at the first time instance, the full-kit task is not in one of the set of predetermined states, the system can determine a full-kit task delay for the full-kit task by computing a time difference between the first time instance and the full-kit date (operation 1304).

On the other hand, in response to determining that, at the first time instance, the full-kit task is in one of the set of predetermined states, the system can determine a second time instance when the full-kit task entered one of the set of pre-determined states, and determine the full-kit task delay for the full-kit task by computing a second time difference between the second time instance and the full-kit date (operation 1306).

In some embodiments, the system can generate and display a report based on the aggregate full-kit task delays for each time bucket from a set of time buckets. A time bucket can generally refer to a contiguous or non-contiguous duration of time. The time buckets in a set of time buckets may or may not overlap with one another, and may or may not correspond to equal durations of time.

Figure 13B:
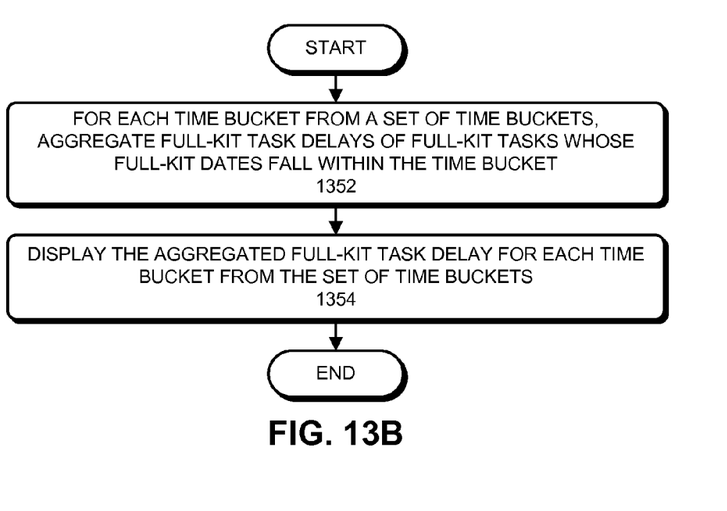
FIG. 13B presents a flow chart that illustrates a process for displaying full-kit task delays in accordance with some embodiments described in this disclosure.

FIG. 13B presents a flow chart that illustrates a process for displaying full-kit task delays in accordance with some embodiments described in this disclosure.

In some embodiments, for each time bucket from a set of time buckets, the system can aggregate full-kit task delays of full-kit tasks whose full-kit dates fall within the time bucket (operation 1352). Next, the system can display the aggregated full-kit task delay for each time bucket from the set of time buckets (operation 1354). Specifically, the system can generate one or more signals that can be used to display the aggregated full-kit task delay for each time bucket from the set of time buckets.

In some embodiments, the system can use a histogram or bar graph to display the aggregated full-kit task delays. Each rectangular bar can correspond to a time bucket from the set of time buckets, and the height of the rectangular bar can correspond to the aggregate full-kit task delay. For example, FIG. 9 illustrates a histogram or bar graph that illustrates the aggregated full-kit task delays for each time bucket from a set of time buckets.

The above-described examples of a report are for illustration purposes only. They are not intended to be exhaustive or to limit the present invention to the forms disclosed. Accordingly, many modifications and variations will be apparent to practitioners having ordinary skill in the art. For example, the system may aggregate full-kit task delays based on other attributes, fields, and/or parameters. In some embodiments, the system may aggregate full-kit task delays for each checklist item over one or more projects. Aggregating full-kit task delays in this manner can help identify checklist items (e.g., parts and/or materials) that are causing the most delays. In some embodiments, the system can display a trend of delays caused by a checklist item.

Figure 14:
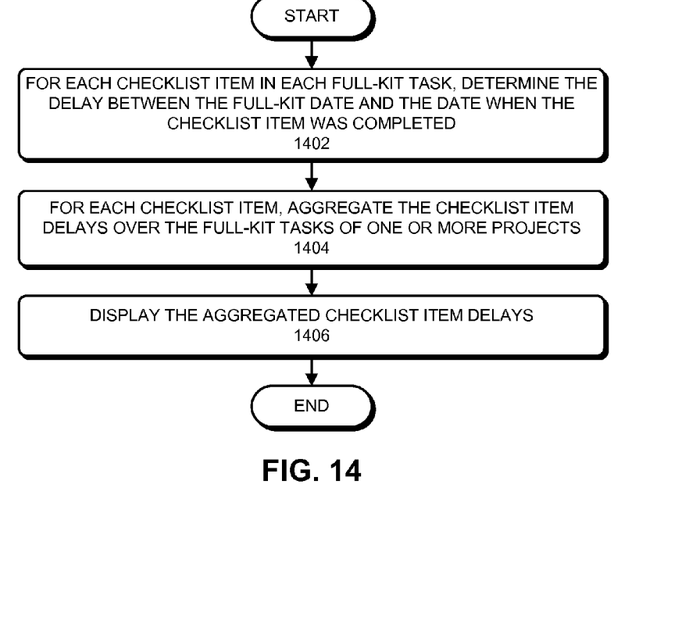
FIG. 14 presents a flow chart that illustrates a process for displaying aggregate delays associated with a checklist item in accordance with some embodiments described in this disclosure.

FIG. 14 presents a flow chart that illustrates a process for displaying aggregate delays associated with a checklist item in accordance with some embodiments described in this disclosure.

For each checklist item in each full-kit task, the system can determine the delay between the full-kit date and the date when the checklist item was completed (operation 1402). Next, for each checklist item, the system can aggregate the checklist item delays over the full-kit tasks of one or more projects (operation 1404). The system can then display the aggregated checklist item delays (operation 1406).

Figure 15:
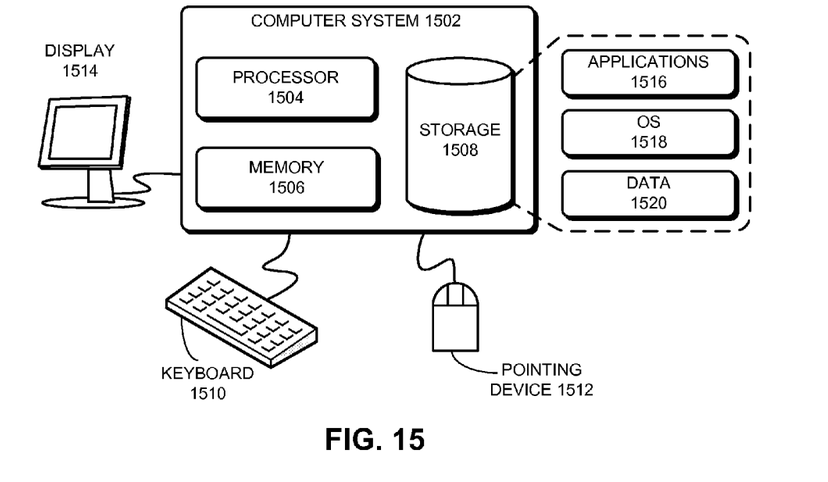
FIG. 15 illustrates a computer system in accordance with some embodiments described in this disclosure.

FIG. 15 illustrates a computer system in accordance with some embodiments described in this disclosure.

A computer system can generally be any system that can perform computations. Specifically, a computer system can be a microprocessor, a network processor, a portable computing device, a personal organizer, a device controller, or a computational engine within an appliance, or any other computing system now known or later developed. Computer system 1502 comprises processor 1504, memory 1506, and storage 1508. Computer system 1502 can be coupled with display 1514, keyboard 1510, and pointing device 1512. Storage 1508 can generally be any device that can store data. Specifically, a storage device can be a magnetic, an optical, or a magneto-optical storage device, or it can be based on flash memory and/or battery-backed up memory. Storage 1508 can store application 1516, operating system 1518, and data 1520.

Application 1516 can include instructions that when executed by computer system 1502 cause computer system 1502 to perform one or more processes that are described explicitly or implicitly in this disclosure. Data 1520 can include project names and start and end times, project buffer information, task names and start and end times, task attributes, task buffer information, task dependency information, full-kit task names, full-kit dates, checklist items for each full-kit task, and/or any other information that may be required for creating full-kit tasks, using full-kit tasks, monitoring full-kit tasks, checking compliance of release conditions of full-kit tasks, and/or determining full-kit task delays. Computer system 1502 can generate signals that can be provided to display 1514 to present information to a user. For example, computer system 1502 can generate signals that can be provided to display 1514 to present a graphical user interface to a user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for determining a full-kit task delay for a full-kit task, the method comprising:
   determining, at a first time instance, whether or not the full-kit task is in one of a set of pre-determined states, wherein the full-kit task specifies a list of items that are used by a set of tasks in a project;
   in response to determining that, at the first time instance, the full-kit task is not in one of the set of predetermined states, determining, by one or more computers, the full-kit task delay by computing a time difference between the first time instance and a full-kit date, wherein the full-kit date is the date by which the full-kit task needs to be completed without causing any delays; and
   in response to determining that, at the first time instance, the full-kit task is in one of the set of predetermined states,
      determining, by one or more computers, a second time instance when the full-kit task entered one of the set of predetermined states, and
      determining, by one or more computers, the full-kit task delay by computing a time difference between the second time instance and the full-kit date.

2. The method of claim 1, further comprising:
   for each time bucket from a set of time buckets, aggregating full-kit task delays of full-kit tasks whose full-kit dates fall within the time bucket; and
   generating one or more signals to display the aggregated full-kit task delay for each time bucket from the set of time buckets.

3. The method of claim 1, wherein the full-kit task includes a list of checklist items which need to be completed by the full-kit date, wherein the method further comprises:
   for each checklist item in each full-kit task, determining a checklist item delay by computing a time difference between the full-kit date and a checklist item completion date;
   aggregating the checklist item delays over the full-kit tasks of one or more projects to obtain aggregated checklist item delays; and
   generating one or more signals to display the aggregated checklist item delays.

4. The method of claim 1, wherein the full-kit task is capable of being in one of the following states: not started, in progress, released, and completed.

5. The method of claim 4, wherein the set of pre-determined states includes the released state and the completed state.

6. The method of claim 1, wherein the full-kit task is created based on a full-kit template.

7. The method of claim 1, wherein the full-kit task is a zero-duration task.

8. A non-transitory computer-readable storage medium storing instructions that, when executed by a computer, cause the computer to perform a method for determining a full-kit task delay for a full-kit task, the method comprising:
   determining, at a first time instance, whether or not the full-kit task is in one of a set of pre-determined states, wherein the full-kit task specifies a list of items that are used by a set of tasks in a project;
   in response to determining that, at the first time instance, the full-kit task is not in one of the set of predetermined states, determining the full-kit task delay by computing a time difference between the first time instance and a full-kit date, wherein the full-kit date is the date by which the full-kit task needs to be completed without causing any delays; and in response to determining that, at the first time instance, the full-kit task is in one of the set of predetermined states,
determining a second time instance when the full-kit task entered one of the set of predetermined states, and
determining the full-kit task delay by computing a time difference between the second time instance and the full-kit date.

9. The non-transitory computer-readable storage medium of claim 8, wherein the method further comprises:
for each time bucket from a set of time buckets, aggregating full-kit task delays of full-kit tasks whose full-kit dates fall within the time bucket; and
generating one or more signals to display the aggregated full-kit task delay for each time bucket from the set of time buckets.

10. The non-transitory computer-readable storage medium of claim 8, wherein the full-kit task includes a list of checklist items which need to be completed by the full-kit date, wherein the method further comprises:
for each checklist item in each full-kit task, determining a checklist item delay by computing a time difference between the full-kit date and a checklist item completion date;
aggregating the checklist item delays over the full-kit tasks of one or more projects to obtain aggregated checklist item delays; and
generating one or more signals to display the aggregated checklist item delays.

11. The non-transitory computer-readable storage medium of claim 8, wherein the full-kit task is capable of being in one of the following states: not started, in progress, released, and completed.

12. The non-transitory computer-readable storage medium of claim 11, wherein the set of pre-determined states includes the released state and the completed state.

13. The non-transitory computer-readable storage medium of claim 8, wherein the full-kit task is created based on a full-kit template.

14. The non-transitory computer-readable storage medium of claim 8, wherein the full-kit task is a zero-duration task.

15. A computer system, comprising:
a processor; and
a computer-readable storage medium storing instructions that, when executed by the processor, cause the computer system to perform a method for determining a full-kit task delay for a full-kit task, the method comprising:
determining, at a first time instance, whether or not the full-kit task is in one of a set of pre-determined states, wherein the full-kit task specifies a list of items that are used by a set of tasks in a project;
in response to determining that, at the first time instance, the full-kit task is not in one of the set of predetermined states, determining the full-kit task delay by computing a time difference between the first time instance and a full-kit date, wherein the full-kit date is the date by which the full-kit task needs to be completed without causing any delays; and
in response to determining that, at the first time instance, the full-kit task is in one of the set of predetermined states,
determining a second time instance when the full-kit task entered one of the set of predetermined states, and
determining the full-kit task delay by computing a time difference between the second time instance and the full-kit date.

16. The computer system of claim 15, wherein the method further comprises:
for each time bucket from a set of time buckets, aggregating full-kit task delays of full-kit tasks whose full-kit dates fall within the time bucket; and
generating one or more signals to display the aggregated full-kit task delay for each time bucket from the set of time buckets.

17. The computer system of claim 15, wherein the full-kit task includes a list of checklist items which need to be completed by the full-kit date, wherein the method further comprises:
for each checklist item in each full-kit task, determining a checklist item delay by computing a time difference between the full-kit date and a checklist item completion date;
aggregating the checklist item delays over the full-kit tasks of one or more projects to obtain aggregated checklist item delays; and
generating one or more signals to display the aggregated checklist item delays.

18. The computer system of claim 15, wherein the full-kit task is capable of being in one of the following states: not started, in progress, released, and completed.

19. The computer system of claim 18, wherein the set of pre-determined states includes the released state and the completed state.

20. The computer system of claim 15, wherein the full-kit task is created based on a full-kit template.

21. The computer system of claim 15, wherein the full-kit task is a zero-duration task.

* * * * *